United States Patent
Carter

[15] 3,664,304
[45] May 23, 1972

[54] CHICK FEEDER

[72] Inventor: Allie F Carter, 822 Olde Hickory Road, Lancaster, Pa. 17601

[22] Filed: Nov. 19, 1969

[21] Appl. No.: 877,891

[52] U.S. Cl..................................................119/61, D30/16
[51] Int. Cl........................................A01k 5/00, A01k 39/00
[58] Field of Search....................119/61, 63, 51; D44/10, 13; D30/16, 13

[56] References Cited

UNITED STATES PATENTS

| | | | |
|---|---|---|---|
| 2,936,926 | 5/1960 | Miller | 119/61 X |
| 3,455,280 | 7/1969 | Keene | 119/61 |
| 491,702 | 2/1893 | Felix | 119/61 |
| 2,583,874 | 1/1952 | Niemann | 119/51 R |

OTHER PUBLICATIONS

Turkey World, reprint of pages 1 & 2, May 1951

*Primary Examiner*—Aldrich F. Medbery
*Attorney*—Clifford B. Price

[57] ABSTRACT

A dish-like element is provided for feeding chicks. The dish-like element is round, colored red to attract the chicks, has a rim which the chicks can climb over and has a groove in the rim as a feed catching and supplemental feed trough. The dish-like element is made of a very thin, inexpensive plastic material.

6 Claims, 2 Drawing Figures

PATENTED MAY 23 1972 3,664,304

INVENTOR
ALLIE F. CARTER

BY Clifford B. [signature]
ATTORNEY

CHICK FEEDER

BACKGROUND OF THE INVENTION

1. Field of the Invention

The invention is directed to an animal feeder and, more particularly, to a feeder used for chicks during the early days of their life.

2. Description of the Prior Art

In the past baby chicks were delivered to the poultrymen in cardboard boxes. The lid of the cardboard box was laid upright on the brooder floor, and the chick feed was placed inside the lid. However, as technology advanced and the cost of the boxes increased, the disposable cardboard boxes were gradually replaced by returnable boxes. Consequently, the poultrymen no longer had an inexpensive chick feeder. Some suppliers are providing collapsible cardboard feeders which are assembled into a box lid-like structure. Conventional feeders for chickens normally contain high sides and means for excluding the chickens from the feed area. However, the problems of dealing with baby chicks as compared with adult chickens are such that the conventional feeders used for adult chickens did not serve to provide adequate feed for the baby chicks.

Recently, a number of chick feeders have been provided on the market; but in every case, they are relatively expensive so that they cannot be used and thrown away. Consequently, they must be cleaned and reused. This cleaning is a time consuming and expensive step. Also, many of the current chick feeders come in a flat state and must be assembled by the poultryman. Again, this is a costly and time consuming step. There is currently a feeder on the market which is formed from a plastic material, and it has a feed groove around its edge in addition to the main feed area. However, this particular unit is not colored to attract the chicks, is square in configuration, has high sides and is made of a thick enough material that it is relatively expensive.

The object here is to provide a chick feeder which is made of the minimum amount of material so that it can be truly a one-use, disposable feeder. Also, the feeder should be capable of being stored in a small area and must primarily function to enable the chicks to get the food for survival.

SUMMARY OF THE INVENTION

The invention is directed to a feeder for small chicks during the early days of their life. The feeder is dish-like in shape. Its rim has a low profile so that the baby chicks may climb over the rim into the feeding area. A groove is provided in the rim for providing strength to the rim and to further provide a feed catching and supplemental feeding area for chicks around the edge of the circular feeder. The feeder is made from a relatively thin nonself-supporting film of plastic, which must have the supplemental groove in the rim to provide the rim with sufficient strength to withstand the weight of a plurality of baby chicks. The low profile of the rim is relative to chick size so that the chicks may readily climb up the rim into the feed area. The feeder is made of a red plastic material which has a tendency to attract the chicks. A small flange is placed on the edge of the feeder for stability. The general configuration of the feeder is such that a plurality of feeders may be nested together for compact storage. The above features contribute toward the provision of a one-time, disposable feeder, which is extremely low in cost and which serves to accomplish very well its function of letting baby chicks easily get their food.

DESCRIPTION OF THE PREFERRED EMBODIMENT

Figure 1:
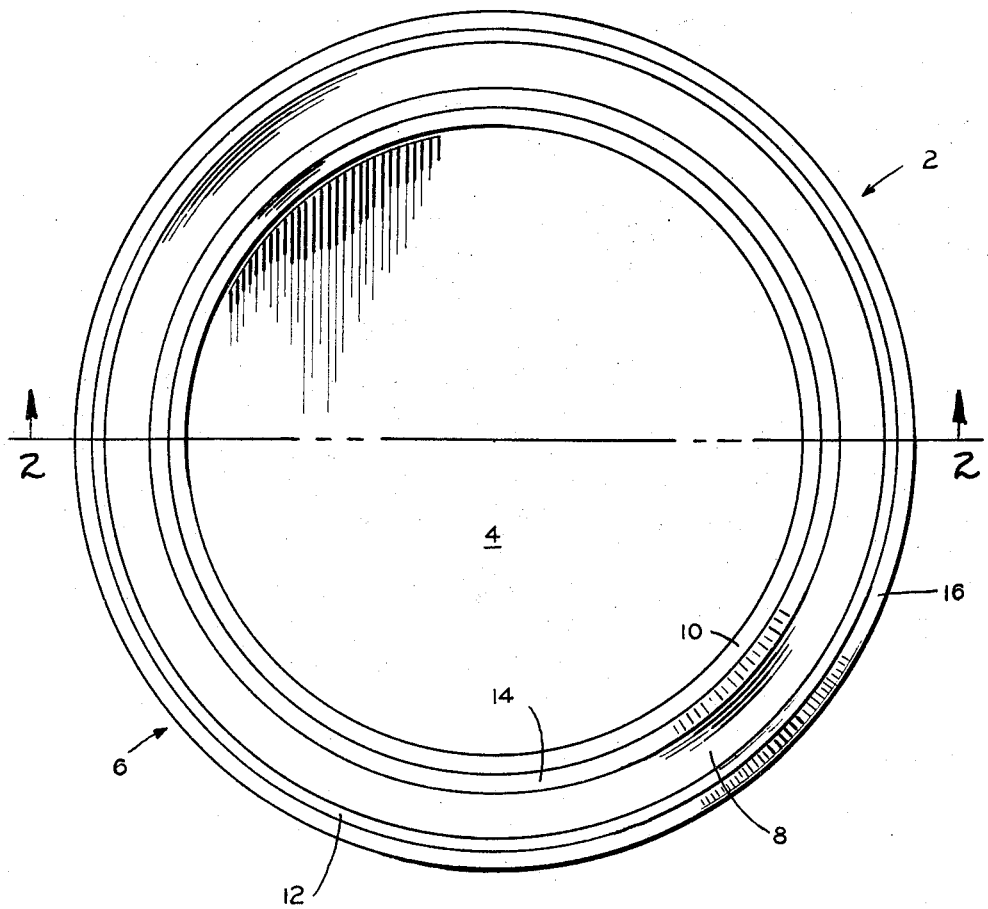
FIG. 1 is a top view of the invention.
Figure 2:
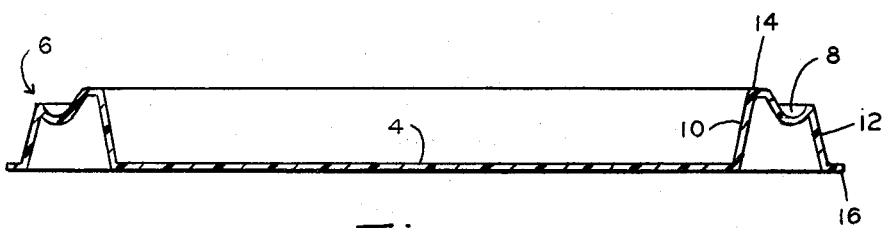
FIG. 2 is a cross-sectional view of the invention, along line 2—2 of FIG. 2.

Referring to FIG. 1, it will be noted that the chick feeder 2 is circular in shape and, as shown in FIG. 2, is dish-like or bowl shaped with a rim 6. The center portion of the feeder 4 is relatively flat and serves as the area into which the chick feed is placed.

The rim 6 is provided with a groove 8. This groove 8 serves two purposes. One purpose is to provide an area into which feed may fall and from which feed may be secured by chicks surrounding the feeder. It is a natural tendency of young chicks to climb right into the bowl and walk across their feed. The chicks, like all chickens, tend to scratch while they are eating and, therefore, tend to throw the feed outwardly from the surface 4. A substantial portion of the feed is caught in the groove 8; therefore, chicks around the edge of the feeder can feed from the groove 8. The second purpose of the groove 8 is to provide strength and rigidity to the rim area 6. The inside of the rim is an upwardly, outwardly sloping wall 10 while the outside of the rim is an upwardly, inwardly sloping wall 12. The top of the rim is at point 14, and the groove extends from the point 14 over to the top of wall 12.

The feeder is made of a relatively thin, nonself-supporting plastic film, which is approximately 5 mils in thickness. It has been found that a nonself-supporting plastic film of a thickness range of 2 to 20 mils will work satisfactorily, but should normally have the groove 8 to provide it with sufficient strength so that the rim 6 will not collapse under the weight of the chicks. It is possible that the feeder can be formed of self-supporting plastic or other materials with a thickness range of 20 to 125 mils. At this time, the groove 8 is not necessarily needed for strength, but would still serve its purpose of providing a supplemental feed area. The feeder is normally made of film plastic; however, it could be injection molded from plastic or formed from paper pulp. In each case, the finished feeder is formed from material that is in the form of a thin material or film-like material.

A flange 16 is provided on the edge of the feeder to provide some degree of rigidity to the rim and to prevent the wall 12 from folding inwardly. The rim 6 is a low profile rim, being of ¾ in. to 1 in. in height, such that a small chick may readily climb over the rim to get within the feed area. The plastic material being used to form the feeder is red in color. It has been found that the red tends to attract the chicks to the feeder, and the feeder herein is the first known feeder on the market to incorporate color attraction for the baby chicks.

As was indicated previously, the rim has a low profile, and it has been found that a 15 in. diameter feeder is ideal for most purposes. The roundness of the feeder has an advantage over conventional rectangular feeders because it provides a general open area all the way around the feeder. The rectangular feeders, when they are placed side by side, form a narrow corridor area therebetween, which tends to channel the chicks away from the feed and disorient them. The height of the rim is approximately 1/6 to 1/10 of the diameter size of the feeder.

Finally, it should be noted in FIG. 2 that the inclined relationship of the walls 10 and 12 is such that a plurality of the feeders may be nested together. As a matter of fact, it has been found that a plurality of feeders nested together to form a stack 8½ in. tall will provide a collection of 200 feeders.

What is claimed is:

1. An animal feeder comprising a circular dish-like shaped element, said element having a relatively flat central area and a rim about the periphery thereof and said rim being of a relatively low profile, said rim being formed by an upwardly, outwardly sloping first wall extending from the flat central area and an upwardly, inwardly sloping second wall joining said first wall, and defining there between an upwardly opening groove, the juncture of the groove with said first wall being of an elevation higher than the juncture of the groove with said second wall defining a downwardly sloping feed catching means, and said feeder being formed of a material which is a relatively thin material.

2. The feeder of claim 1 wherein the thin material is nonself-supporting.

3. The feeder of claim 1, wherein the low profile rim height is approximately 1/6 to 1/10 of the diameter size of the dish-like shaped element.

4. The feeder of claim 3 wherein the relatively thin material is approximately 5 mils in thickness.

5. The feeder of claim 4 wherein there is provided a stabilizing flange at the peripheral edge of the feeder to strengthen the rim of the dish-like shaped element.

6. The feeder of claim 5 wherein the feeder is colored red.

* * * * *